Jan. 1, 1952    H. G. EDSALL    2,580,744
SPECTACLE SHIELD
Filed June 11, 1949

Inventor
Harrison G. Edsall

By Glenn L. Fish
Attorney

Patented Jan. 1, 1952

2,580,744

UNITED STATES PATENT OFFICE 2,580,744

SPECTACLE SHIELD

Harrison G. Edsall, Spokane, Wash.

Application June 11, 1949, Serial No. 98,607

1 Claim. (Cl. 2—13)

My present invention relates to an improved spectacle shield of the type adapted to prevent perspiration drops from running from the forehead onto the lenses of the spectacles thereby distorting the vision and causing great annoyance to the wearer.

According to my invention the temples of the spectacles and the nose of the wearer support and retain a curved trough made of plastic or other pliable material so that the same may be bent to conform to the forehead of the wearer, the trough terminating at the temples so that the collected drops of perspiration will be discharged at the temples and will not contact the lenses.

In the accompanying drawings I have illustrated one complete example of the physical embodiment of my invention according to the best mode I have thus far devised, but it will be understood that various changes and alterations may be made in the exemplified structure within the scope of the appended claim.

Figures 1, 2:
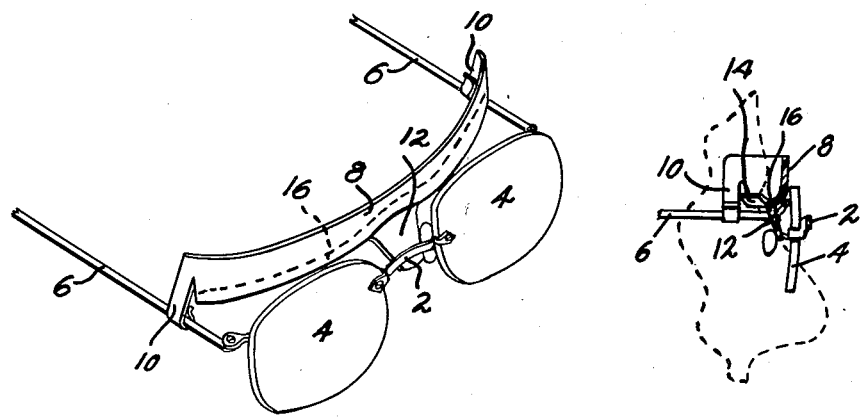
Fig. 1 is a perspective view of the shield of my invention shown mounted on a pair of spectacles.
Fig. 2 is a transverse vertical sectional view thereof.
Figure 3:
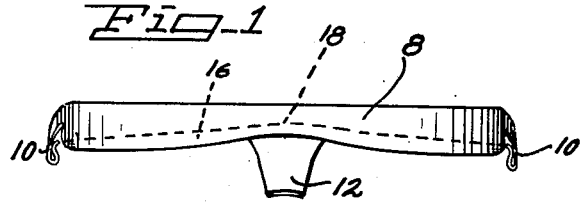
Fig. 3 is a front elevational view of the shield.

Referring now to the drawings wherein I have illustrated the present preferred embodiment of my invention I use a conventional pair of spectacles including the bridge or nose piece 2 securing the lenses 4 to which are pivotally secured the temples 6.

The shield of my invention comprises a curved wall 8 having depending end tongues 10 terminating in hooks bent about and supported by the temples 6, and a center tongue 12 bent at a suitable angle to rest upon the nose of the wearer.

The lower edge of the wall 8 is curved upwardly upon itself as at 14 to form a continuous trough 16 having a high central point 18 and the trough bottom declines from the center to the outer open ends.

Thus with the shield formed to fit in spaced relation to the wearer's forehead and with the trough extending rearwardly below the eyebrows and above the eyes, the drops of perspiration will be caught and collected by the trough and discharged from the ends thereof.

Figures 4, 5:
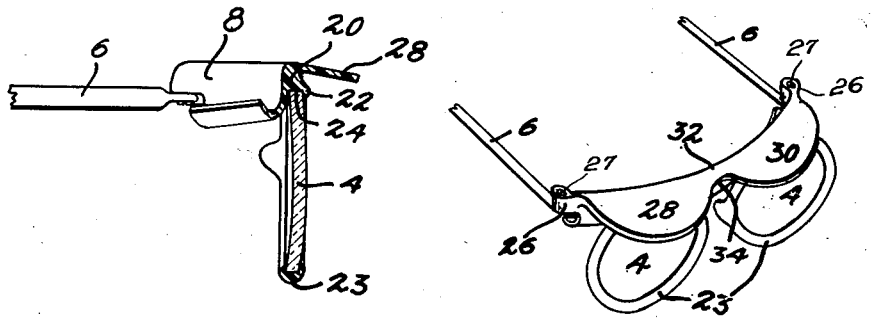
Fig. 4 is a perspective view of a modified form wherein I employ additionally a sun visor.
Fig. 5 is a transverse vertical sectional view thereof.

In the modified form of Figs. 4 and 5, the wall 8 of the shield is thickened as at 20 to form shoulder 22 on the upper portion of circular frame 23 grooved as at 24 on its inner side to receive the lenses 4. Ear extensions 26 are bent about vertical axes to receive screws 27 for securing the temples. I also provide a horizontal extension at the front edge of wall 8 and this extension is cut away at 34 to form a restricted connecting portion 32 between the shields 28 and 30. The shields extend forwardly above the lenses to provide a sun visor for the eyes.

Having thus fully described my invention what I claim as new and desire to secure by Letters Patent is:

A spectacle shield comprising a strip of a length adapting it to extend the full width of spectacles between the rearwardly extending temples thereof, said strip being curved longitudinally to conform to the transverse curvature of a person's forehead, said strip having its lower edge portion curved rearwardly and upwardly and forming a perspiration receiving trough extending longitudinally of the strip and open at its ends, the trough having a rear wall constituting a forehead-engaging portion, the said trough sloping downwardly from midway the length of the trough towards opposite ends thereof and serving to direct perspiration towards the open ends of the trough, tongues at the ends of said strip extending outwardly and downwardly and having temple-engaging hooks at their lower ends, and a tongue extending downwardly and forwardly midway the length of the strip in position for resting upon a person's nose back of the nose piece of the spectacles.

HARRISON G. EDSALL.

REFERENCES CITED

The following references are of record in the file of this patent:

UNITED STATES PATENTS

| Number | Name | Date |
|---|---|---|
| 1,544,925 | Nelson | July 7, 1925 |
| 1,911,842 | Naulty | May 30, 1933 |
| 2,052,772 | Jones | Sept. 1, 1936 |
| 2,055,386 | Peavy | Sept. 22, 1936 |
| 2,093,536 | Alvord | Sept. 21, 1937 |
| 2,247,971 | Snell | July 1, 1941 |

FOREIGN PATENTS

| Number | Country | Date |
|---|---|---|
| 358,996 | Germany | Sept. 18, 1922 |